United States Patent
Gardner

(10) Patent No.: US 10,128,536 B2
(45) Date of Patent: Nov. 13, 2018

(54) MULTI-CELL LITHIUM-ION BATTERIES

(71) Applicant: A123 Systems, LLC, Waltham, MA (US)

(72) Inventor: William H. Gardner, Waltham, MA (US)

(73) Assignee: A123 Systems, LLC, Waltham, MA (US)

( * ) Notice: Subject to any disclaimer, the term of this patent is extended or adjusted under 35 U.S.C. 154(b) by 718 days.

(21) Appl. No.: 14/402,676

(22) PCT Filed: May 21, 2013

(86) PCT No.: PCT/US2013/041985
§ 371 (c)(1),
(2) Date: Nov. 20, 2014

(87) PCT Pub. No.: WO2013/177138
PCT Pub. Date: Nov. 28, 2013

(65) Prior Publication Data
US 2015/0155596 A1   Jun. 4, 2015

Related U.S. Application Data

(60) Provisional application No. 61/649,562, filed on May 21, 2012.

(51) Int. Cl.
*H01M 10/0567* (2010.01)
*H01M 10/04* (2006.01)
(Continued)

(52) U.S. Cl.
CPC ......... *H01M 10/0567* (2013.01); *H01M 2/24* (2013.01); *H01M 2/26* (2013.01);
(Continued)

(58) Field of Classification Search
CPC .................................................. H01M 2/0242
See application file for complete search history.

(56) References Cited

U.S. PATENT DOCUMENTS

| 6,551,741 B1 | 4/2003 | Hamada et al. |
| 7,338,734 B2 | 3/2008 | Chiang et al. |

(Continued)

FOREIGN PATENT DOCUMENTS

| CN | 102306717 A | 1/2012 |
| JP | 2001057199 A | 2/2001 |

(Continued)

OTHER PUBLICATIONS

ISA Korean Intellectual Property Office, International Search Report of PCT/US2013/041985, dated Aug. 28, 2013, WIPO, 3 pages.

(Continued)

*Primary Examiner* — Barbara L Gilliam
*Assistant Examiner* — Nathanael T Zemui
(74) *Attorney, Agent, or Firm* — McCoy Russell LLP

(57) ABSTRACT

Lithium ion (Li-ion) multi-cell batteries in which the requirements for individual monitoring and controlling charging of each cell, the requirements for monitoring and controlling charge balancing and the effects of repeated charging and discharging are ameliorated are presented. In one or more embodiments, the multi-cell battery includes configuration material that substantially provides a moisture barrier.

15 Claims, 7 Drawing Sheets

(51) Int. Cl.
*H01M 10/0587* (2010.01)
*H01M 10/42* (2006.01)
*H01M 10/0525* (2010.01)
*H01M 2/24* (2006.01)
*H01M 2/34* (2006.01)
*H01M 2/26* (2006.01)
*H01M 4/58* (2010.01)
*H01M 10/052* (2010.01)

(52) U.S. Cl.
CPC ......... *H01M 2/348* (2013.01); *H01M 4/5825* (2013.01); *H01M 10/0431* (2013.01); *H01M 10/0525* (2013.01); *H01M 10/0587* (2013.01); *H01M 10/4235* (2013.01); H01M 10/049 (2013.01); H01M 10/052 (2013.01); H01M 2300/0025 (2013.01); Y10T 29/49108 (2015.01)

(56) References Cited

U.S. PATENT DOCUMENTS

| | | | |
|---|---|---|---|
| 7,579,112 B2 | 8/2009 | Chiang et al. | |
| 7,811,710 B2 | 10/2010 | Dahn et al. | |
| 7,851,092 B2 | 12/2010 | Amine et al. | |
| 7,939,201 B2 | 5/2011 | Chiang et al. | |
| 8,057,936 B2 | 11/2011 | Chiang et al. | |
| 2001/0019796 A1* | 9/2001 | Kang | H01M 10/052 429/94 |
| 2003/0232239 A1* | 12/2003 | Gow | H01M 2/0242 429/120 |
| 2005/0048361 A1 | 3/2005 | Wang et al. | |
| 2006/0088759 A1 | 4/2006 | Roh | |
| 2006/0199080 A1* | 9/2006 | Amine | H01M 4/366 429/326 |
| 2007/0031732 A1* | 2/2007 | Chiang | C01B 25/45 429/231.95 |
| 2007/0212596 A1 | 9/2007 | Nebrigic et al. | |
| 2010/0081048 A1* | 4/2010 | Nansaka | H01M 2/06 429/158 |
| 2010/0192362 A1 | 8/2010 | Yoon et al. | |
| 2011/0111649 A1* | 5/2011 | Garascia | H01M 2/1077 439/890 |
| 2011/0177366 A1* | 7/2011 | Nagasaki | H01M 2/1022 429/83 |
| 2012/0009485 A1 | 1/2012 | Xu et al. | |
| 2012/0077084 A1 | 3/2012 | Christensen et al. | |
| 2012/0125447 A1* | 5/2012 | Fuhr | H01M 2/0262 137/260 |

FOREIGN PATENT DOCUMENTS

| | | | | |
|---|---|---|---|---|
| JP | 2008135374 A | 6/2008 | | |
| JP | 2010527134 A | 8/2010 | | |
| JP | 2011530271 A | 12/2011 | | |
| JP | 2012033507 A | 2/2012 | | |
| WO | WO 2013051012 A2 * | 4/2013 | | H01M 2/202 |

OTHER PUBLICATIONS

State Intellectual Property Office of the People's Republic of China, First Office Action Issued in Application No. 201380038807.8, dated Aug. 22, 2016, 17 pages.

Japan Patent Office, Office Action Issued in Patent Application No. 2015-514108, dated Dec. 16, 2016, 11 pages. (Submitted with Partial Translation).

* cited by examiner

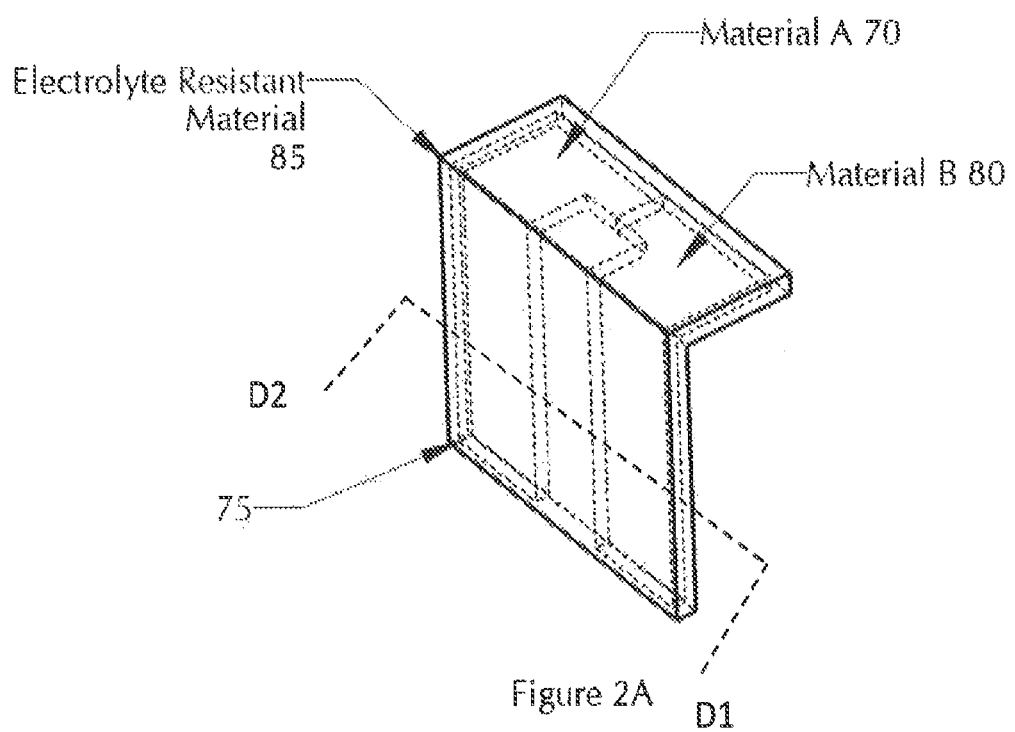
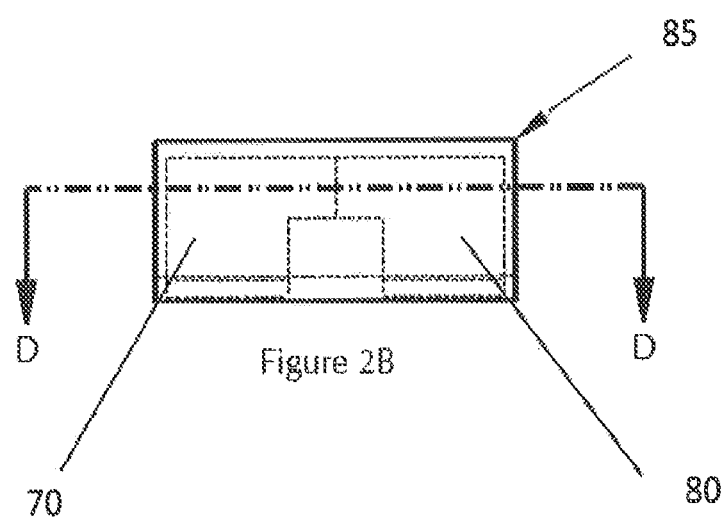

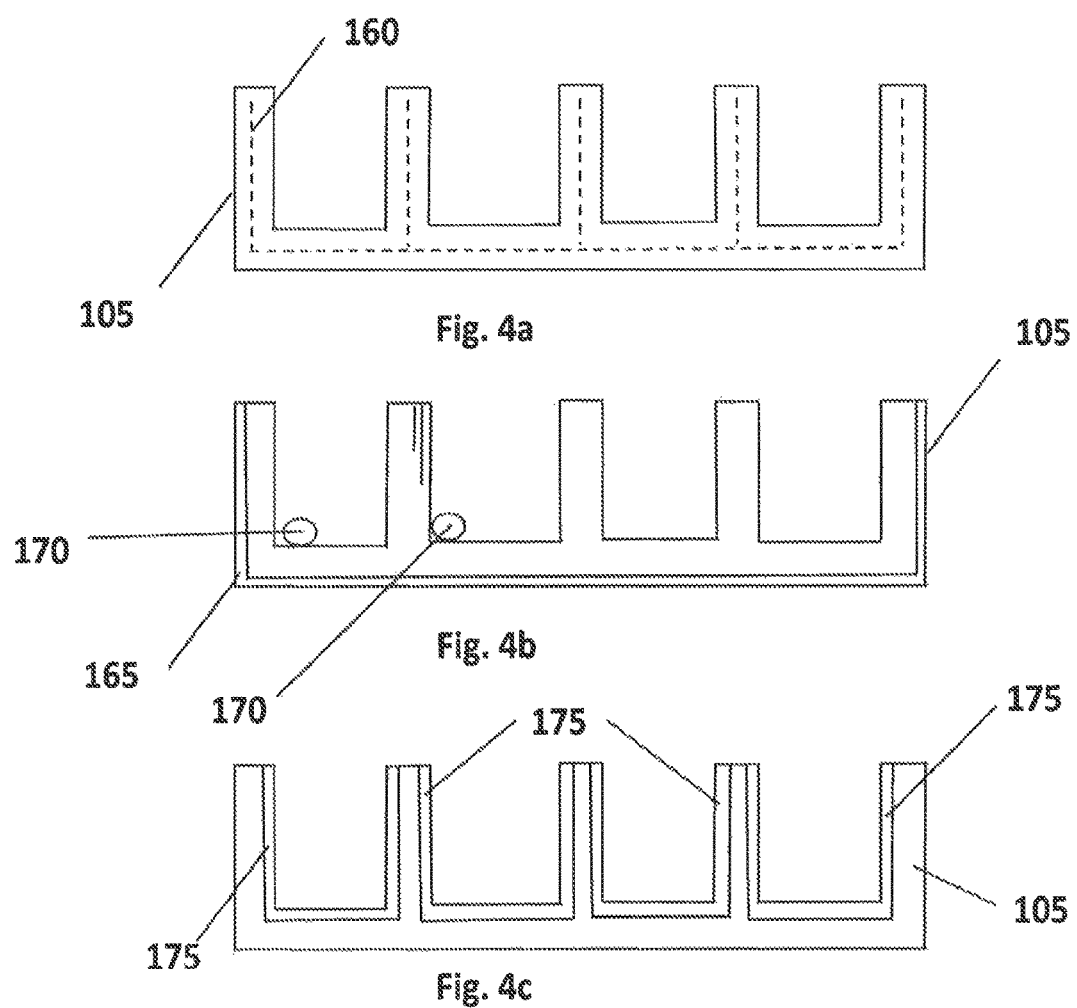

MULTI-CELL LITHIUM-ION BATTERIES

CROSS REFERENCE TO RELATED APPLICATIONS

This application is the United States National Phase of International Patent Application Serial No. PCT/US2013/041985, entitled "Multi-Cell Lithium-Ion Batteries," filed May 21, 2013, which claims priority to U.S. Provisional Patent Application No. 61/649,562, entitled "Multi-Cell Lithium-Ion Batteries," filed May 21, 2012, the entire contents of each of which are hereby incorporated by reference in their entirety for all purposes.

TECHNICAL FIELD

These teachings relate generally to multi-cell batteries, and, more particularly, to Li-ion multi-cell batteries.

BACKGROUND AND SUMMARY

Conventional Lithium-ion (Li-ion) multi-cell batteries require a battery management system to prevent over-charge, under-charge and other difficulties and to balance cells to eliminate state-of-charge mismatches. As the number of voltage of a multi-cell and the number of cells increase, the potential for mismatch in conventional multi-cell batteries also increases since, in a series configuration, some of the cells can be charged to a higher voltage than others. There is a need for multi-cell battery designs that ameliorate the requirement to monitor and control the balancing during charging and the charging.

In Lithium ion cells, electrode materials tend to swell or contract due to the insertion or ejection of the Lithium ions into and out of the intercalation spaces during charging and discharging. As the cells are repeatedly charged and discharged, the electrode structure can weaken and thereby reducing adhesion to the current collector. The reduction in adhesion can reduce battery life. There is also a need for multi-cell battery designs that ameliorate the effects of repeated charging and discharging.

Injection molding provides a relatively inexpensive method of manufacturing. However, many of the materials used in injection molding are permeable to water vapor and organic solvent vapors. The transfer of moisture into a lithium-ion battery and electrolyte vapor out of a lithium-ion battery can affect the performance and the life of the battery. There is also a need for multi-cell battery designs that substantially incorporate a moisture barrier.

Due to chemical compatibility and corrosion problems, the connectors that are attached to the anode (−) or cathode (+) electrodes in a lithium ion battery are limited to a few metal types. In a multi-cell battery, there is a need for connector designs for connecting a positive electrode to a negative electrode.

Embodiments of Lithium ion (Li-ion) multi-cell batteries are disclosed. In the embodiments disclosed herein below, the requirements for individual monitoring and controlling charging of each cell and for monitoring and controlling charge balancing are ameliorated. In one or more of the embodiments disclosed, the effects of repeated charging and discharging are ameliorated. In one or more embodiments, the multi-cell battery includes configuration materials that substantially provide a moisture barrier.

In one or embodiments, the multi-cell battery of these teachings includes a container having a number of cell cavities, a number of electrochemical assemblies, each electrochemical assembly enfolded, one of the enfolded electrochemical assemblies disposed in each one of the cavities, each one of the electrochemical assemblies having a positive electrode and a negative electrode and a separator material between the positive electrode and the negative electrode. The multi-cell battery of this embodiment also includes an electrolyte in each of the cell cavities, the electrolyte comprising a lithium salt and a redox shuttle, the electrolyte and electrodes selected to, during battery operation, provide substantially a predetermined voltage across each electrochemical assembly in each cell cavity, the redox shuttle being selected to substantially provide shuttle operations when voltage across each electrochemical assembly in each cell cavity reaches substantially another predetermined voltage, and a cover disposed on the container, the cover being permanently attached to the container so as to form a substantially hermetic seal between the cover and the container, the cover forming a seal between each of the cell cavities.

Other embodiments of the multi-cell battery of these teachings are also disclosed.

For a better understanding of the present teachings, together with other and further objects thereof, reference is made to the accompanying drawings and detailed description and its scope will be pointed out in the appended claims.

BRIEF DESCRIPTION OF THE DRAWINGS

FIGS. 2A and 2B are graphical schematic representations of one embodiment of a bimetallic joint connector used in one or more embodiments of the multi-cell battery of these teachings.

FIGS. 4A-4C represent cross-sectional views of embodiments of the container used in one or more embodiments of the multi-cell battery of these teachings.

DETAILED DESCRIPTION

Figure 1A:
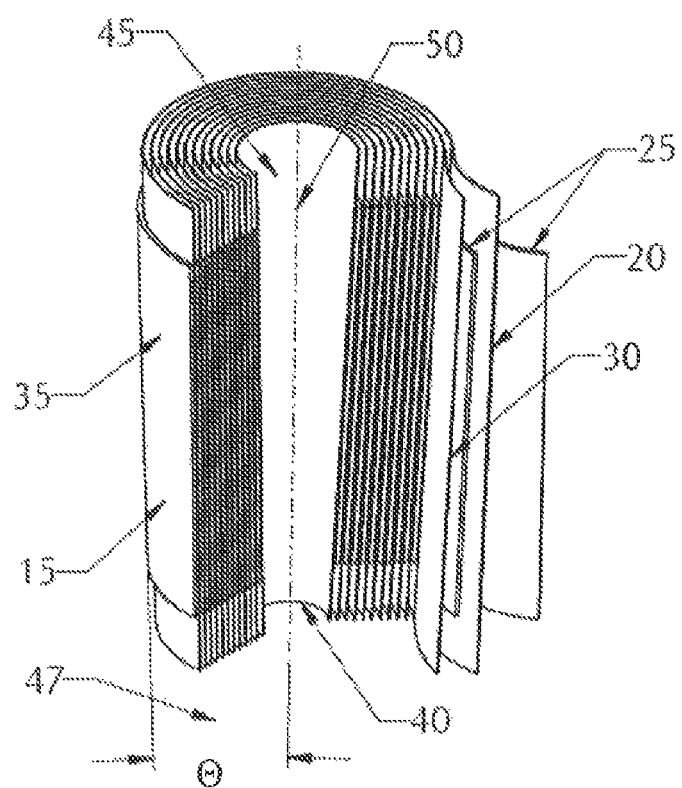
FIGS. 1A-1C are graphical schematic representations of embodiments of an enfolded electrochemical assembly used in one or more embodiments of the multi-cell battery of these teachings.

The following detailed description is of the best currently contemplated modes of carrying out these teachings. The description is not to be taken in a limiting sense, but is made merely for the purpose of illustrating the general principles of these teachings, since the scope of these teachings is best defined by the appended claims.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about."

To assist in the understanding of the present teachings the following definition is presented.

The phrase "redox shuttle," as used herein, refers to an electrochemically reversible moiety that during charging of a lithium-ion cell can become oxidized at the cell's positive electrode, migrate to the cell's negative electrode, become reduced at the negative electrode to reform the unoxidized (or less-oxidized) shuttle species, and migrate back to the positive electrode.

Embodiments of Lithium ion (Li-ion) multi-cell batteries are disclosed herein below. In the embodiments disclosed herein below, the requirements for individual monitoring and controlling charging of each cell and for monitoring and controlling charge balancing are ameliorated. In one or more of the embodiments disclosed hereinbelow, the effects of repeated charging and discharging are ameliorated. In one or more embodiments disclosed hereinbelow, the multi-cell battery includes configuration material that substantially provide a moisture barrier.

In one or embodiments, the multi-cell battery of these teachings includes a container having a number of cell cavities, a number of electrochemical assemblies, each electrochemical assembly enfolded, one of the enfolded electrochemical assemblies disposed in each one of the cavities, each one of the electrochemical assemblies having a positive electrode and a negative electrode and a separator material between the positive electrode and the negative electrode. The multi-cell battery of this embodiment also includes an electrolyte in each of the cell cavities, the electrolyte comprising a lithium salt and a redox shuttle, the electrolyte and electrodes selected to, during battery operation, provide substantially a predetermined voltage across each electrochemical assembly in each cell cavity, the redox shuttle being selected to substantially provide shuttle operations when voltage across each electrochemical assembly in each cell cavity reaches substantially another predetermined voltage, and a cover disposed on the container, the cover being permanently attached to the container so as to form a substantially hermetic seal between the cover and the container, the cover forming a seal between each of the cell cavities.

Including the redox shuttle in an embodiment of these teachings enables a multi-cell battery to be charged (formed) as a multi-cell assembly, rather than requiring each individual cell be monitored and charged individually. Incorporation of an electrochemical shuttle also substantially reduces the need to add complexity to the invention in the form of multiple electrical feed-throughs to provide voltage monitoring and current leads to each enfolded electrochemical assembly in order to effect charge "balancing".

Exemplary embodiments of redox shuttles, these teachings not being limited only to those embodiments, are disclosed in U.S. Pat. No. 7,811,710, issued on Oct. 12, 2010, and in U.S. Pat. No. 7,851,092, entitled "Redox shuttle for overcharge protection of lithium batteries," issued on Dec. 14, 2010, both of which are incorporated by reference herein in their entirety for all purposes.

In one instance, the redox shuttle includes an aromatic compound having at least one aromatic ring with four or more electronegative substituents, two or more oxygen atoms bonded to the aromatic ring, and no hydrogen atoms bonded to the aromatic ring.

In one or more embodiments, a number of bar connectors are securely attached to each one positive electrode and to each one negative electrode in each one electrochemical assembly; at least one bar connector attached to each positive electrode and at least another bar connector attached to each negative electrode.

In one or more embodiments of the method of these teachings, the need for a battery management system used to balance cells in a multi-cell battery is obviated by providing a number of electrochemical assemblies, each electrochemical assembly disposed in one cell cavity from a number of cell cavities, each one of the electrochemical assemblies has a positive electrode and a negative electrode and a separator material between the positive electrode and the negative electrode, and providing an electrolyte in each of the cell cavities, the electrolyte containing a lithium salt and a redox shuttle; the electrolyte and electrodes selected to, during battery operation, provide substantially a predetermined cell voltage across each electrochemical assembly in each cell cavity. The redox shuttle is selected to substantially provide shuttle operations when voltage across each electrochemical assembly in each cell cavity reaches substantially another predetermined voltage. The cells are balanced by maintaining battery voltage at a predetermined balancing voltage for a predetermined time. In one or more instances, the embodiments of redox shuttles disclosed herein above are used in embodiments of the method of these teachings.

In one or more embodiments, each enfolded electrochemical assembly is a substantially spirally wound electrochemical assembly (also referred to as a "jelly roll"). FIG. 1A shows a graphical representation of a jelly roll assembly. Referring to FIG. 1A, the jelly roll assembly 15 is a substantially spirally wound electrochemical assembly having a positive electrode 20, one or more separators 25 and a negative electrode 30.

It should be noted that the structure shown in FIG. 1A is shown only for illustration purposes and the jelly roll assembly could be a variation of that shown in FIG. 1A, such as, but not limited to, a wound flat wrap jellyroll assembly. It should be noted that these teachings are not limited to the structure shown in FIG. 1A and other configurations of an electrochemical assembly such as, but not limited to, a prismatic electrochemical assembly, pouch type electrochemical assembly, a Z-fold stacked configuration or other types of electrochemical assemblies. In one instance, the Z-fold design (see, for example, United States Patent Application Publication 20050048361, published on Mar. 3, 2005, also United States Patent Application Publication 20060088759, published on Mar. 27, 2006, both of which are incorporated by reference herein in their entirety for all purposes) could incorporate a compliant layer, tapered in cross-sectional thickness to generate a tapered subassembly matching the draft angle of a housing (such as a plastic housing).

In one instance, the substantially spirally wound electrochemical assembly has an inner surface and an outer surface, the inner surface defining a central space; and wherein the central space is substantially filled with a compliant material, the compliant material having elastic behavior. The electrochemical assembly shown in FIG. 1A has an outer surface 35 and an inner surface 40, the inner surface 40 defining an inner space 45. In another instance, the compliant material is a flexible and inert polymer. In one embodiment, these teachings may not be limited to only that embodiment, the compliant material is a flexible and inert polymer. In one instance, the flexible and inert polymer is polyisobutylene. While not desiring to be bound by theory, in one explanation, the compliant material serves to provide compressive pressure on the jelly roll after the battery is filled with electrolyte and subsequent electrical cycling typical of use, both of which typically cause the electrode coatings to swell or separate slightly. In order to provide optimal life of the product, it is desirable to maintain some level of compressive pressure on the electrode layers to hold them tightly together.

In another embodiment, the outer surface 35 of the substantially spirally wound electrochemical assembly is inclined with respect to a center axis 50 of the substantially spirally wound electrochemical assembly (at an angle θ 47), the inclination constituting a taper, the taper being selected to be substantially equal to a taper of walls of each cell cavity.

Figure 1B:
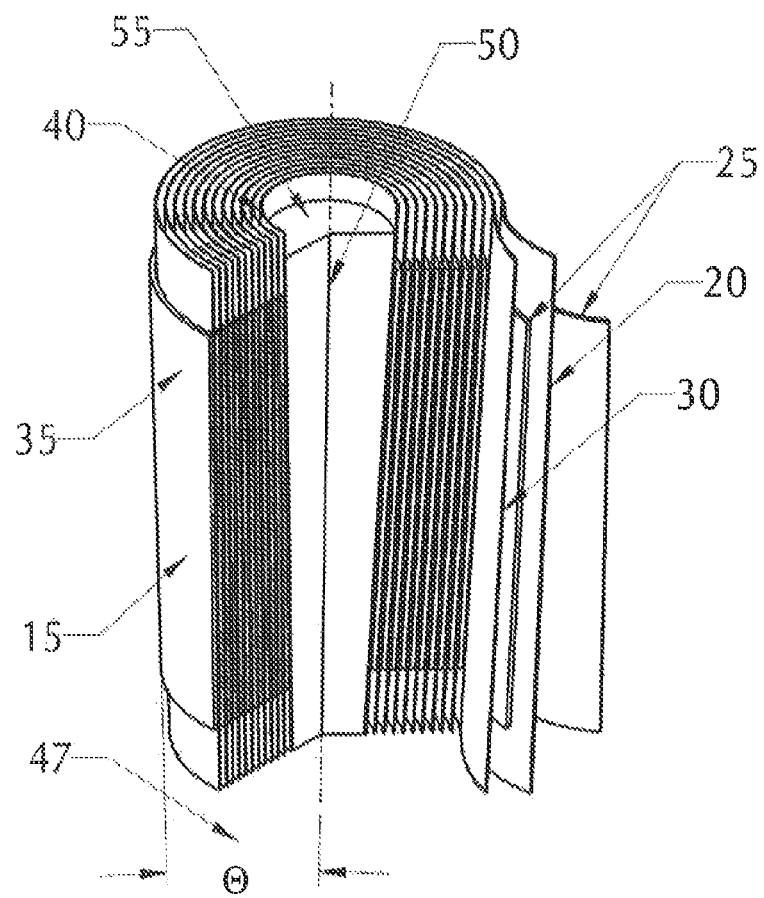
Figure 1C:
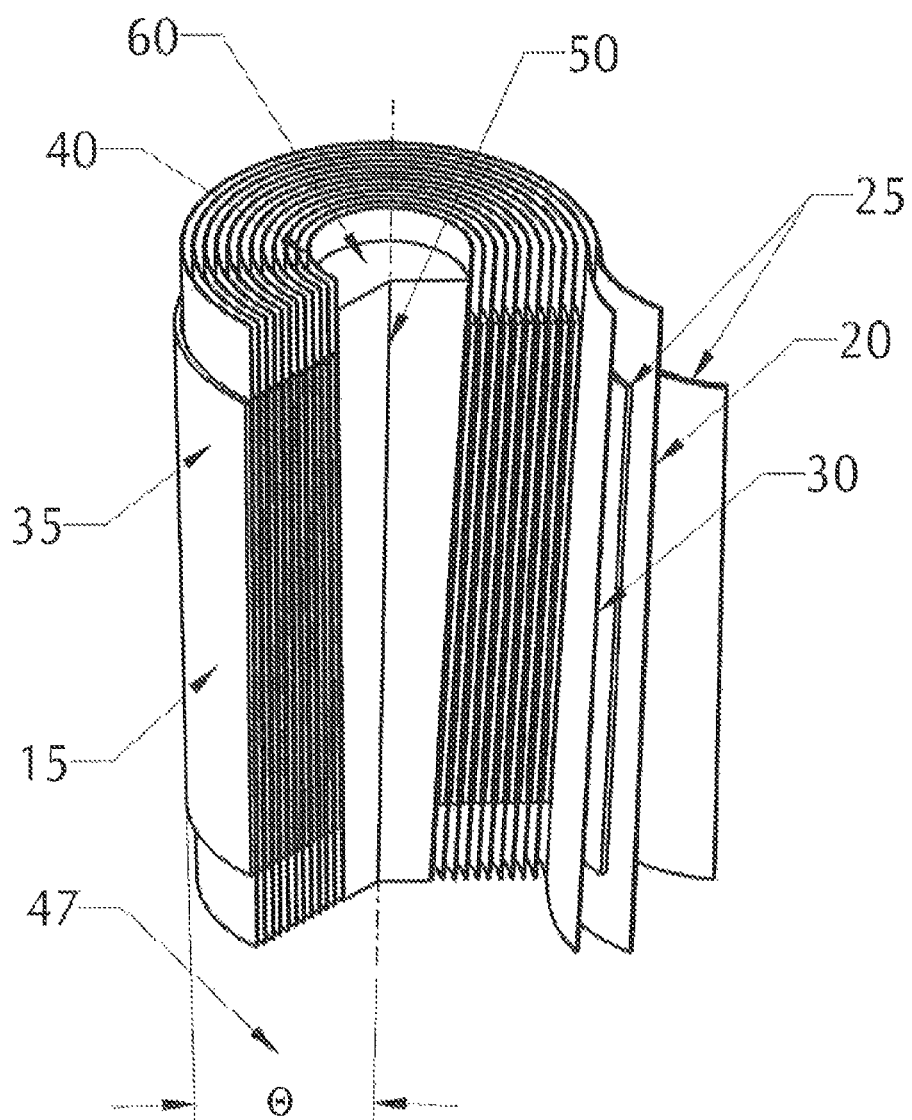

The taper can be imposed if the jellyroll is wound onto a mandrel with a slight taper (about 5 degrees in an exemplary embodiment, these teachings as being limited to only that exemplary embodiment), with the widest portion coincident with the top of the battery assembly and the narrowest portion coincident with the bottom of the battery assembly. In one instance, the taper is designed to substantially match a taper molded into the plastic case. It is typical to taper injection molded parts in the direction in which the mold opens and closes in order to facilitate fast cycle time and easy extraction from the mold. A taper (also called a "draft") of about 5 degrees is typical, although it should be noted that these teachings are not limited to only that typical example. FIG. 1B illustrates the jelly roll assembly 15 wound onto a mandrel 55. FIG. 1C shows the jelly roll assembly 15 having the compliant material 60 disposed in the inner space 45.

In one instance, the flexible and inert polymer is polyisobutylene. It should be noted that similar, flexible and inert polymers are also within the scope of these teachings.

In the embodiment of the multi-cell battery of these teachings disclosed herein above, a number of bar connectors (also referred to as busbars) are securely attached to positive electrode and the negative electrodes in at least some of the electrochemical assemblies. At least one bar connector is securely attached to each positive electrode and at least one other bar connector is securely attached to each one negative electrode. In one instance, the positive electrode (cathode) has an aluminum foil as a current collector and the negative electrode (anode) has a copper foil as the current collector. In that instance, these teachings not being limited only to that instance, busbars connected to the copper anode foil are preferably made of copper due do its inherent inability to alloy with lithium and its inherently low electrical resistivity. Busbars connected to the aluminum cathode foil are preferably made of aluminum due to its inherent resistance to corrosion at the positive potential of the internal lithium-ion battery environment. In other instances, the busbars that are attached to the anode (−) or cathode (+) electrodes in a lithium ion battery are limited to a few metal types selected in view of chemical compatibility and to avoid corrosion problems. Busbars are welded to the electrochemical assemblies by one of a number of welding processes, including laser welding and ultrasonic welding. Conventional busbar welding techniques are applied in welding the busbars to the electrochemical assembly.

In one or more embodiments, at least some of the of the electrochemical assemblies are connected in series and the battery of these teachings includes at least one bimetallic joint connector connecting the positive electrode in one electrochemical assembly to the negative electrode in another electrochemical assembly in order to connect one electrochemical assembly in series with another electrochemical assembly. One section of the bimetallic joint connector includes a metal compatible with the positive electrode and another section of the bimetallic joint connector includes another metal compatible with the negative electrode. The two sections are electrically operatively connected to each other.

In one instance, externally exposed surfaces of the bimetallic joint connector are substantially covered with an electrolyte resistant material. An "electrolyte resistant material," as used here in, is a material that substantially prevents contact with the electrolyte at an electric potential that will either cause corrosion or chemical change. In the instance in which the positive electrode (cathode) has an aluminum foil as a current collector and the negative electrode (anode) has a copper foil as the current collector, these teachings not being limited to only that instance, the electrolyte resistant material prevents contact with the electrolyte and the potential that will either corrode the copper or cause the aluminum to alloy with lithium.

In one embodiment, the electrolyte resistant material is an electrolyte resistant polymer. In one instance, the electrolyte resistant polymer is polypropylene. In another instance, the electrolyte resistant material is polyisobutylene.

FIGS. 2A and 2B show embodiments of the bimetallic joint connector 75 of these teachings. Referring to FIG. 2A, in the embodiment shown therein, one section 70 of a first metallic material (labeled material A) is disposed next to and operatively electrically connected to another section 80 of a second metallic material (labeled material B). At least a portion of the bimetallic joint connector 75 is covered by an electrolyte resistant material 85. FIG. 2B shows a cross-sectional view of the cross section labeled DD' in FIG. 2A. The portion of the bimetallic joint connector 75 that is covered by the electrolyte resistant material 85 is shown in FIGS. 2A and 2B for illustration and a number of other configurations are within the scope of these teachings.

Figure 3A:
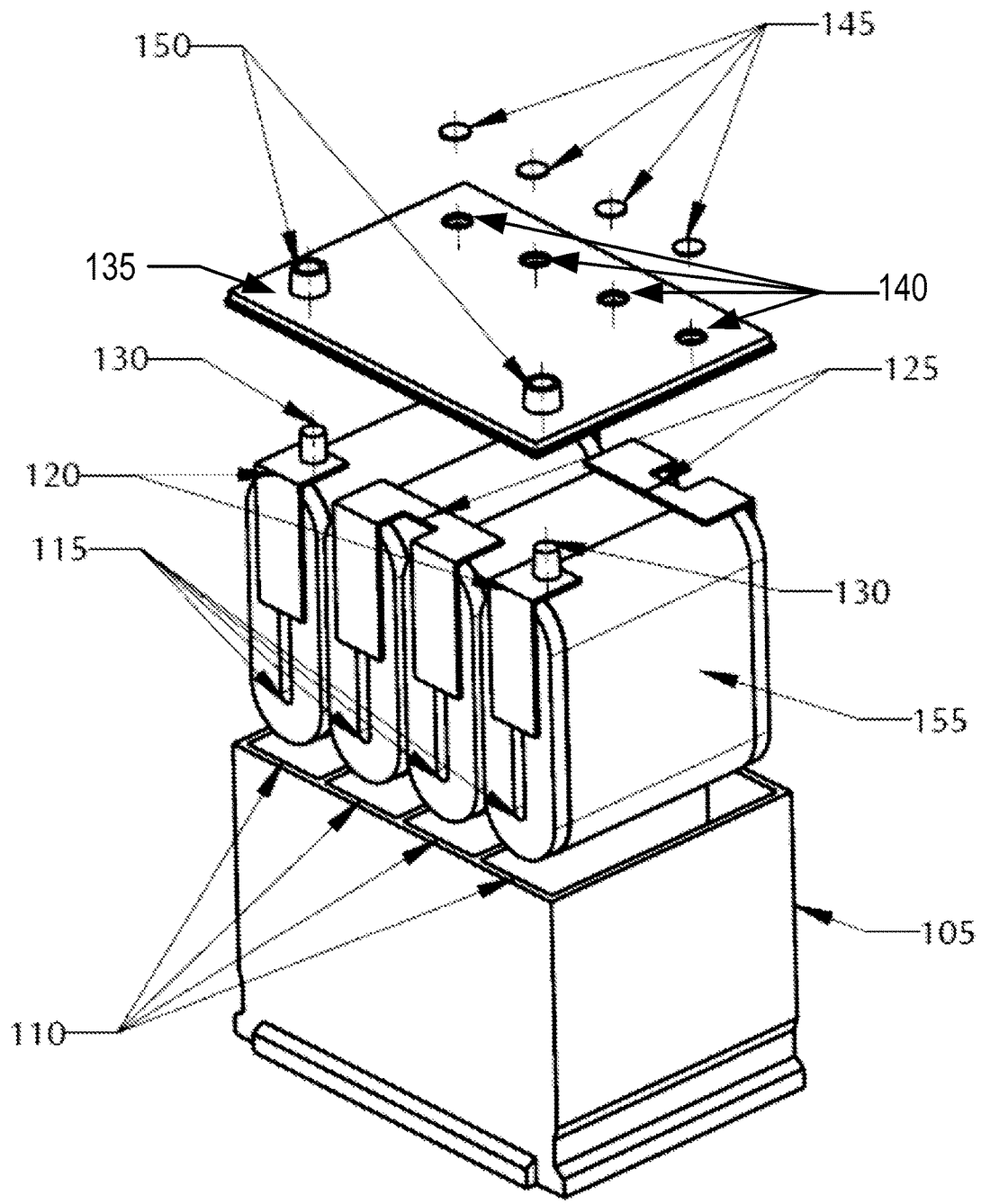
FIGS. 3A and 3B are graphical schematic representations of one embodiment of the multi-cell battery of these teachings.
Figure 3B:
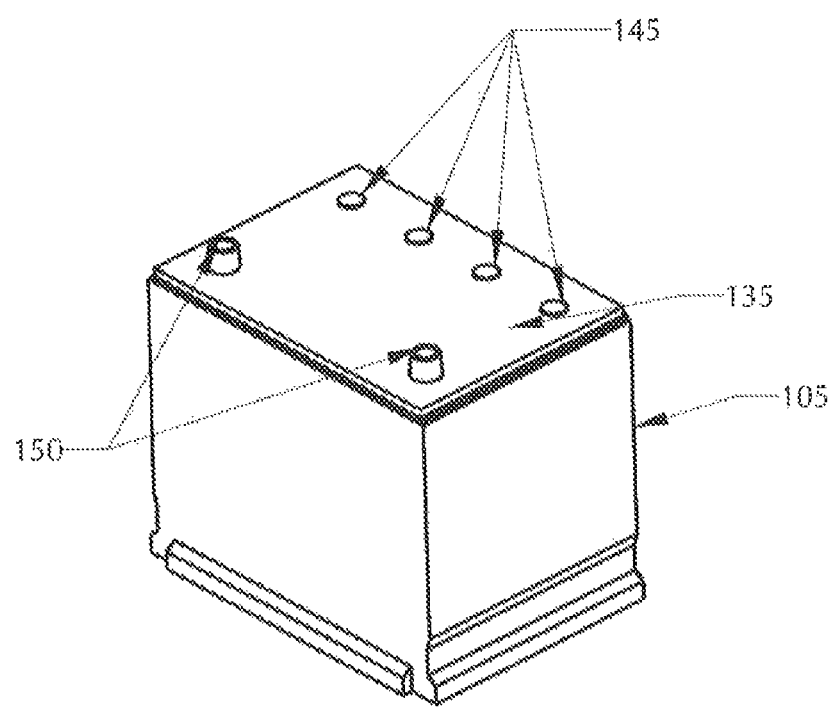

An embodiment of the multi-cell battery of these teachings is shown in FIGS. 3A and 3B. Referring to FIG. 3A, in the embodiment shown therein, the multi-cell battery of these teachings includes a container 105 having a number of cell cavities 110. The walls of each cell cavity can be, in one instance, structurally reinforced in order to resist the stresses due to electrode swelling produced by cycling. In one instance, these teachings not being limited to only that instance, the enclosure is comprised of a polymer. In one instance, these teachings not being limited to only that instance, the polymer is Polypropylene (other potentially viable polymers include polyester and polyethylene). The embodiment shown in FIG. 3A also has a number of enfolded electrochemical assemblies 115, each enfolded electrochemical assembly 115 being disposed in one of the cavities 110. Each electrochemical assembly has a positive electrode and a negative electrode and one or more separator materials, one separator material disposed between the positive electrode and the negative electrode (see FIG. 1A). In one instance, these teachings not being limited only to that instance, the enfolded electrochemical assembly is a substantially spirally wound electrochemical assembly (also referred to as a "jelly roll" assembly). In one instance, the jellyroll assembly is wound such that the outside surface of the jellyroll assembly has a taper, the taper chosen to correspond to the taper induced on the walls of each cavity during manufacturing (see FIG. 1B).

Busbars 120 are securely attached to positive electrode and the negative electrodes in at least some of the electrochemical assemblies (to one positive electrode and to one negative electrode in the embodiment shown). Bimetallic joint connectors 125 provide a series connection between positive and negative electrodes of adjacent electrochemical assemblies. Terminal posts 130 are securely attached to the busbars 120. One terminal post 130 is attached to a positive electrode and another terminal post 130 is attached to another busbar 120 attached to a negative electrode. The positive terminal post is preferably, but not limited to, an aluminum post. The negative terminal post is preferably, but not limited to, a copper, brass, or bronze post.

A cover 135 is disposed over the container 105. In the embodiment shown in FIG. 3A, the cover 135 has two terminals 150, the terminals 150 configured to receive the posts 130, each terminal being constructed of a material compatible with the material of one of the posts 130. In the embodiment shown in FIG. 3A, the cover 135 has a number of fill openings 140, each opening 140 disposed so as to enable providing electrolyte to each cell cavity 110. It should be noted that embodiments of the cover 135 which do not have fill openings 140 are also within the scope of these teachings. (For example, embodiments in which the electrochemical assemblies 115 in which a "pouch cell" construction utilized for each electrochemical assembly may not require fill openings in the cover 135.) In the embodiment shown in FIG. 3A, the cover 135 has a number of stoppers 145. Each stopper 145 is configured to fill one of the fill openings 140 and pressed in place, forcing to effect a hermetic seal over the fill opening 140. In one embodiment, the stopper 145 comprises a number of layers of metal laminated polymer, in one instance, polymer aluminum laminate. In one instance, the stopper 145 is pressed in place via hotplate to obtain a hermetic seal over the fill opening. In one exemplary embodiment, the stopper 140 is an about five layer polymer aluminum laminate similar to that used in the pouch material in lithium-ion pouch cell electrochemical assemblies. In one instance, the cover 135 has an internal metallic layer that substantially acts as a barrier to moisture. In an exemplary embodiment, the metallic layer is an aluminum layer.

FIG. 3B shows an assembled multi-cell battery. The cover 135 is permanently attached to the container 105. In one exemplary embodiment, the cover 135 is permanently attached by a welding process in which both the cover and the container are exposed to a heated plate (heated to above the melting point of the material in the cover and the container) and afterwards pressed together to affect a hermetic seal. In one instance, the cover is configured to establish a substantially liquid tight seal between each of these cell cavities. In the embodiment shown in FIG. 3B, a substantially hermetic seal and a low resistance connection is established between terminals 150 and the posts 130. In one exemplary embodiment, a weld, braze or solder is used to establish the substantially hermetic seal and a low resistance connection. Laser welding, TIG welding, MIG welding are typical welding processes that could be used in the exemplary embodiment.

In one embodiment, the container includes a layer of conductive material that substantially provides a barrier to moisture and the vapors. In one instance, the layer of conductive material is embedded within the walls of the container. (In one exemplary embodiment, the layer of conductive material is an aluminum layer and the layer is greater than 50 microns thick.) In another instance, the layer of conductive material is disposed on the external surfaces of the container. (In this instance, the layer of conductive material could be deposited on the external surfaces, could be a foil disposed on the external surfaces or an enclosure disposed on the external surfaces.) In yet another instance, the layer of conductive material is disposed on internal surfaces of the container. In another embodiment, a desiccant is disposed inside each cell cavity. In one instance, the desiccant is used to further ensure that moisture is substantially not present in each cell cavity.

FIG. 4A shows a cross-sectional review of the container illustrating a layer of conductive material 160 embedded within the walls of the container 105. FIG. 4B shows a cross-sectional view of the container 105 illustrating a layer of conductive material 165 disposed on the external surfaces of the container 105. Desiccant components 170 are shown in each of the cell cavities 110. FIG. 4C shows a cross-sectional view of the container illustrating a layer of conductive material 175 disposed on the internal surfaces of the container 105. In the embodiment of the multi-cell battery corresponding to the embodiment of the layer of conductive material shown in FIG. 4C, the electrochemical assembly has a protective outer layer (155, FIG. 3A) to prevent contact between the outer electrode foil and the conductive layer.

In one or more embodiments, one or both of the electrode materials in the electrochemical assembly are selected in order to obtain desired properties, such as, but not limited to, highly rate capability, high energy and/or a desired cell voltage. For example, structures and materials that have advantageous properties are described in U.S. Pat. No. 7,579,112, issued on Aug. 25, 2009, U.S. Pat. No. 7,338,734, issued on Mar. 4, 2008, U.S. Pat. No. 7,939,201, issued on May 10, 2011, and U.S. Pat. No. 8,057,936, issued on Nov. 15, 2011, all of which are incorporated by reference herein in their entirety and for all purposes. In one instance, the positive electrode in each enfolded electrochemical assembly comprises an olivine compound having a composition $Li_xM'_yM''_a(PO_4)$, and a predetermined surface area (at least about 15 $m^2/g$ in one instance), wherein M' is at least iron, M" is a first row transition metal selected from Ti, V, Cr, Mn, Co and Ni, x is equal to or greater than 0, and a and y are greater than 0. In another instance, the positive electrode in each enfolded electrochemical assembly comprises a lithium transition metal phosphate material having a predetermined specific surface area (at least about 20 $m^2/g$ in one instance) and including only one transition metal, the lithium transition metal phosphate and the surface area selected to provide at least two co-existing olivine phases during cycling of the battery, wherein the two co-existing olivine phases include a lithium-rich transition metal phosphate phase and a lithium-poor transition metal phosphate phase, wherein the percentage molar volume difference between the two phases is less than about 6.4%.

It should be noted that these teachings are not limited to only the above disclosed embodiment. Embodiments including oxide based cathodes are also within the scope of these teachings.

It should be noted that, in an embodiment as shown in FIGS. 3A and 3B, by proper selection of the electrode materials a predetermined voltage can be obtained for each cell. By connecting in series the electrochemical assemblies in each adjoining cell and selecting a number of electrochemical assemblies, a multi-cell battery of a predetermined voltage (for example, but not a limitation of the teachings, 12 volts) can be obtained. A redox shuttle that effectively allows current to shunt the separator when each cell is exposed to a predetermined voltage differential can be selected. By such a selection of the redox shuttle and the electrode materials, an embodiment of the series connected multi-cell battery of these teachings in which the cells can be balanced by maintaining the battery voltage at a predetermined balancing voltage for an extended period of time can be obtained.

For the purposes of describing and defining the present teachings, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Although the invention has been described with respect to various embodiments, it should be realized these teachings are also capable of a wide variety of further and other embodiments within the spirit and scope of the appended claims.

The invention claimed is:

1. A battery comprising:
a container having a number of cell cavities;
a number of electrochemical assemblies, each electrochemical assembly enfolded, one of said number of electrochemical assemblies disposed in each one of said number of cell cavities; wherein each electrochemical assembly comprises a substantially spirally wound electrochemical assembly; and each one of said number of electrochemical assemblies comprising:
a positive electrode and a negative electrode; and a separator material between the positive electrode and the negative electrode;
an electrolyte in each cell cavity from said number of cell cavities, said electrolyte comprising a lithium salt and a redox shuttle; said electrolyte and positive and negative electrodes selected to, during battery operation, provide a predetermined voltage across each electrochemical assembly in each cell cavity; said redox shuttle being selected to provide shuttle operations when voltage across each electrochemical assembly in each cell cavity reaches another predetermined voltage; and
a cover disposed on said container; said cover being permanently attached to said container so as to form a hermetic seal between said cover and said container; said cover forming a seal between each cell cavity;
wherein said substantially spirally wound electrochemical assembly has an inner surface and an outer surface, the inner surface defining a central space;
wherein the outer surface of said substantially spirally wound electrochemical assembly is inclined with respect to a center axis of said substantially spirally wound electrochemical assembly; inclination constituting a taper, said taper being selected to be equal to a taper of walls of each cell cavity from the number of cell cavities;
wherein said central space is filled with a compliant material, said compliant material having elastic behavior;
wherein said compliant material is a flexible and inert polymer capable of applying a compressive pressure on the substantially spirally wound electrochemical assembly; and
wherein said flexible and inert polymer consists of polyisobutylene.

2. The battery of claim 1, wherein the redox shuttle comprises an aromatic compound having at least one aromatic ring with four or more electronegative substituents, two or more oxygen atoms bonded to said at least one aromatic ring, and no hydrogen atoms bonded to said at least one aromatic ring.

3. The battery of claim 1 further comprising a number of bar connectors securely attached to each positive electrode and to each negative electrode in each electrochemical assembly; at least one bar connector being securely attached to each positive electrode and at least another one bar connector being securely attached to each negative electrode.

4. The battery of claim 3, wherein at least some of the number of electrochemical assemblies are connected in series; and wherein the battery comprises at least one bimetallic joint connector connecting the positive electrode in one electrochemical assembly to the negative electrode in another one of said number of electrochemical assemblies in order to connect said one electrochemical assembly in series with said another one of said number of electrochemical assemblies; wherein one section of said at least one bimetallic joint connector comprises a metal compatible with the positive electrode and another section of said at least one bimetallic joint connector comprises another metal compatible with the negative electrode; said one section being electrically operatively connected to said another section,
wherein externally exposed surfaces of said at least one bimetallic joint connector are covered with an electrolyte resistant material,
wherein said electrolyte resistant material comprises an electrolyte resistant polymer, and
wherein said electrolyte resistant polymer comprises polypropylene.

5. The battery of claim 1, wherein said container comprises a layer of conductive material providing a barrier to moisture and vapors; and wherein the layer of conductive material is on each of three sides of a container cell.

6. The battery of claim 5, wherein said layer of conductive material is embedded within walls of said container.

7. The battery of claim 5, wherein said layer of conductive material is disposed on external surfaces of said container.

8. The battery of claim 5, wherein said layer of conductive material is disposed on internal surfaces of said container.

9. The battery of claim 5, further comprising a desiccant component disposed inside each cell cavity.

10. The battery of claim 1, wherein said cover comprises a conductive material layer disposed on an internal surface of said cover; said conductive material layer providing a moisture barrier.

11. The battery of claim 1, wherein at least some electrochemical assemblies from the number of electrochemical assemblies are connected in series; and wherein the battery comprises at least one bimetallic joint connector connecting the positive electrode in one electrochemical assembly to the negative electrode in another electrochemical assembly in order to connect said one electrochemical assembly in series with said another electrochemical assembly;
wherein one section of said at least one bimetallic joint connector comprises a metal compatible with the positive electrode and another section of said at least one bimetallic joint connector comprises another metal compatible with the negative electrode; said one section being electrically operatively connected to said another section;
externally exposed surfaces of said at least one bimetallic joint connector being covered with an electrolyte resistant material; said container comprising a layer of conducting material providing a barrier to moisture and vapors; and said cover comprising a conducting material layer disposed on an internal surface of said cover; said conducting material layer providing a moisture barrier; and
wherein each electrochemical assembly is connected in series with another one of said number of electrochemical assemblies.

12. The battery of claim 11, wherein the positive electrode in each electrochemical assembly comprises an olivine compound having a composition $Li_xM'_yM''_a(PO_4)$, and a predetermined surface area, wherein M' is at least iron, M" is a first row transition metal selected from Ti, V, Cr, Mn, Co, and Ni, x is equal to or greater than 0, and a and y are greater than 0.

13. The battery of claim 11, wherein the positive electrode in each electrochemical assembly comprises a lithium transition metal phosphate material having a predetermined specific surface area and including only one transition metal, the lithium transition metal phosphate material and the surface area selected to provide at least two co-existing olivine phases during cycling of the battery, wherein the two co-existing olivine phases include a lithium-rich transition metal phosphate phase and a lithium-poor transition metal phosphate phase, wherein a percentage molar volume difference between the two phases is less than about 6.4%, and wherein the predetermined specific surface area is at least about 20 $m^2$/g.

14. The battery of claim 1, wherein the positive electrode in each electrochemical assembly comprises an olivine compound having a composition $Li_xM'_yM''(PO_4)$, and a predetermined surface area, wherein M' is at least iron, M'' is a first row transition metal selected from Ti, V, Cr, Mn, Co, and Ni, x is equal to or greater than 0, and a and y are greater than 0.

15. The battery of claim 1, wherein the positive electrode in each electrochemical assembly comprises a lithium transition metal phosphate material having a predetermined specific surface area and including only one transition metal, the lithium transition metal phosphate material and the surface area selected to provide at least two co-existing olivine phases during cycling of the battery, wherein the two co-existing olivine phases include a lithium-rich transition metal phosphate phase and a lithium-poor transition metal phosphate phase, wherein a percentage molar volume difference between the two phases is less than about 6.4%, and wherein the predetermined specific surface area is at least about 20 $m^2$/g.

* * * * *